UNITED STATES PATENT OFFICE.

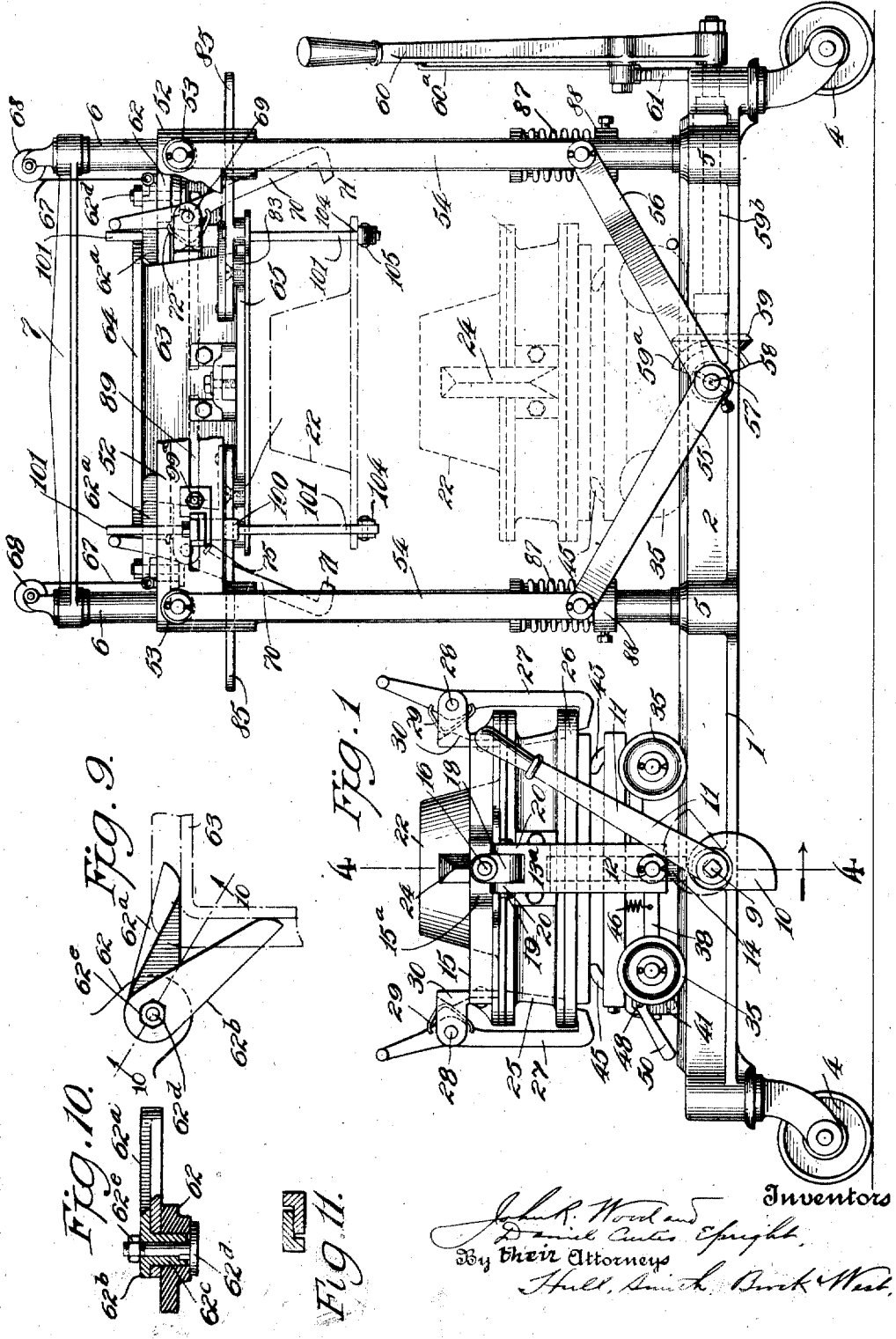

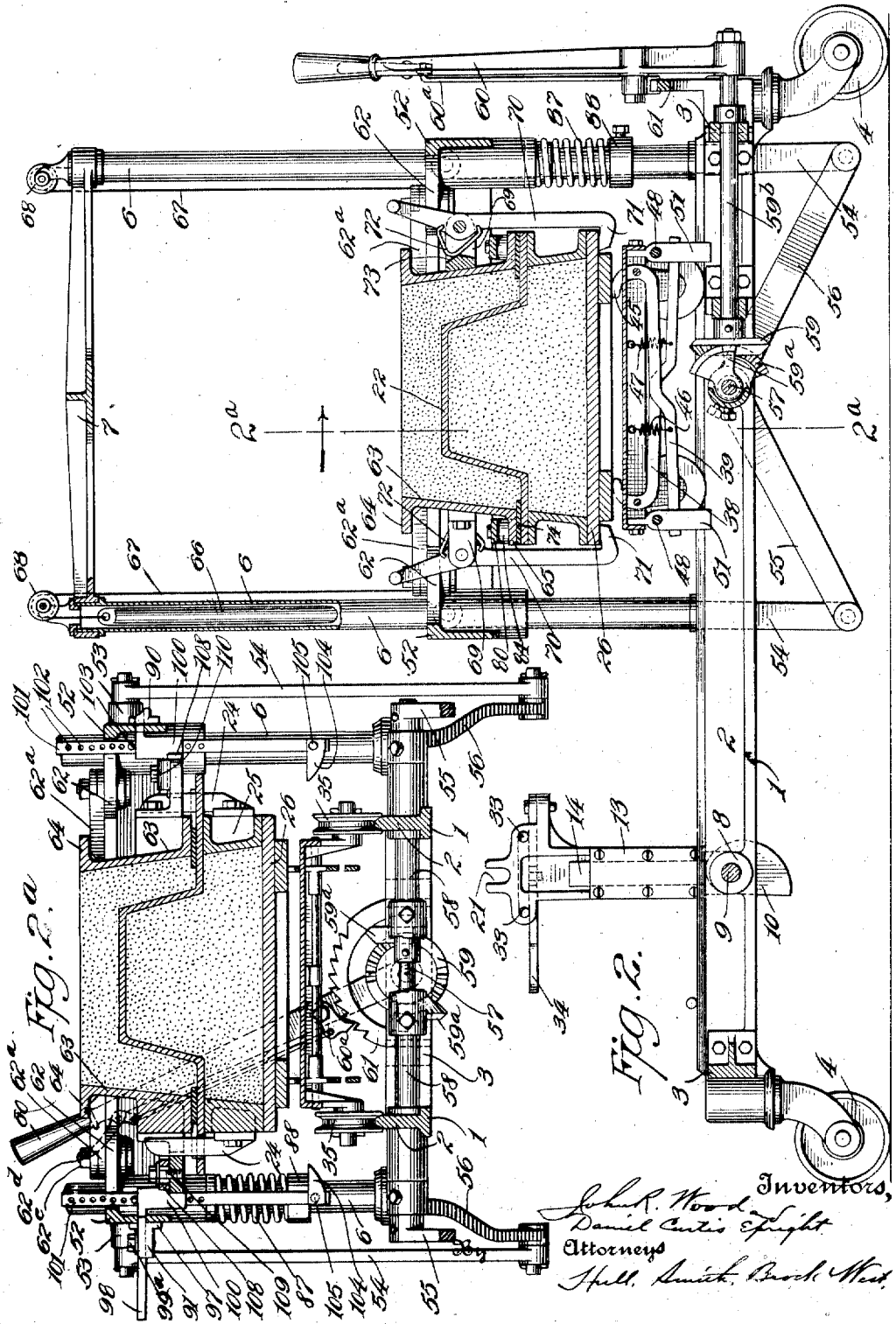

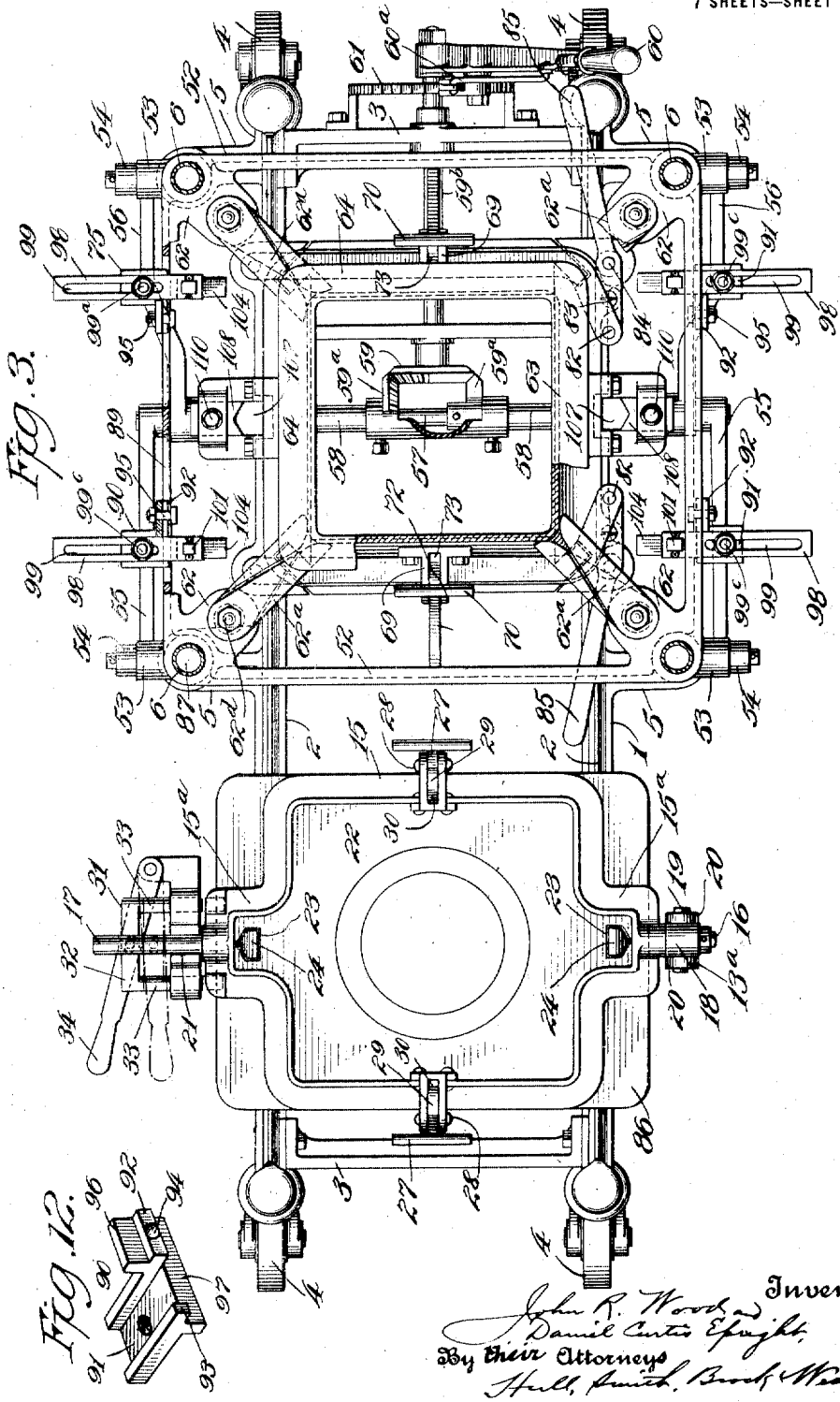

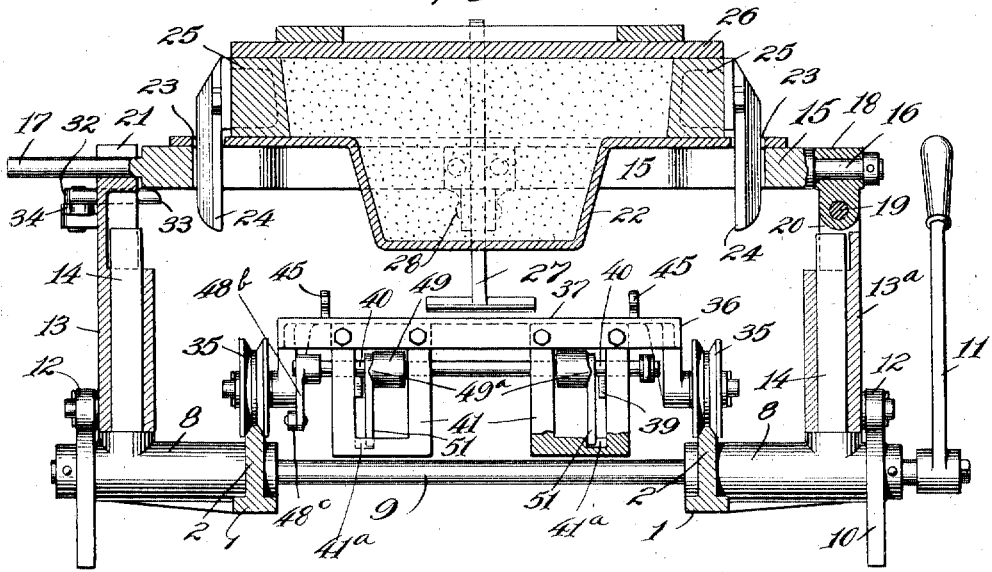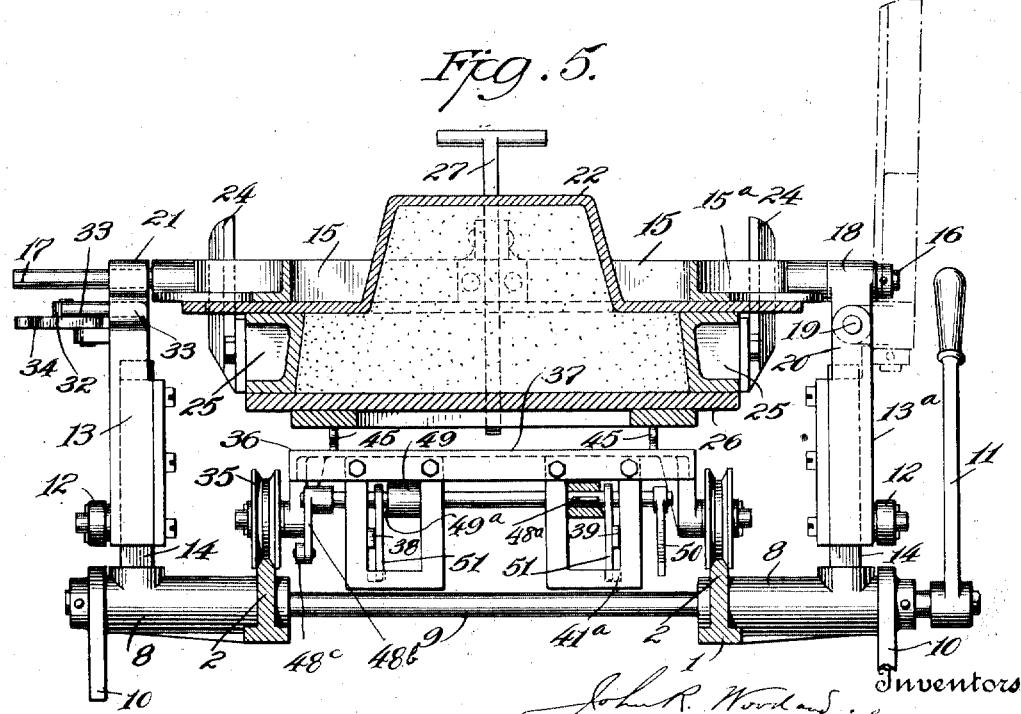

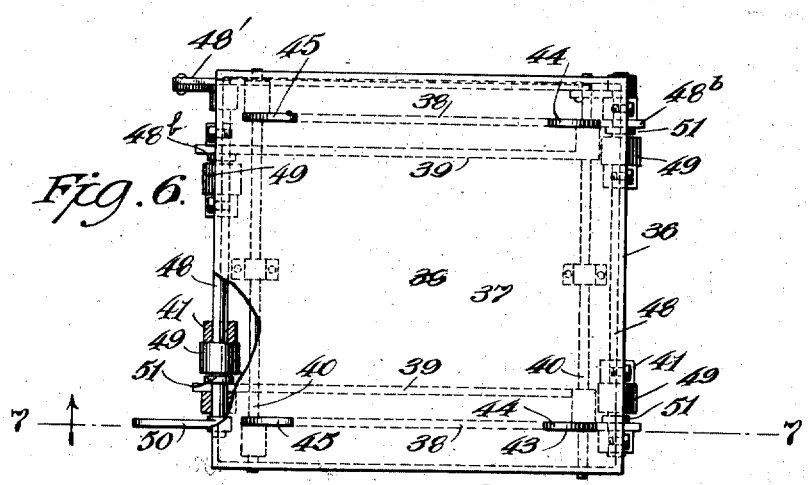
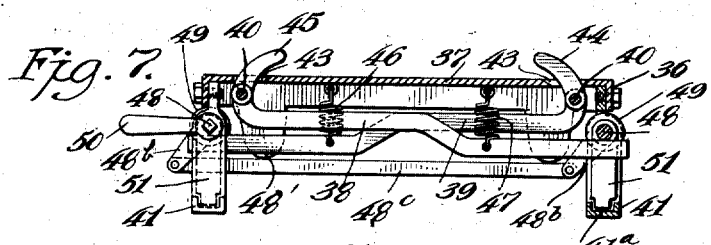
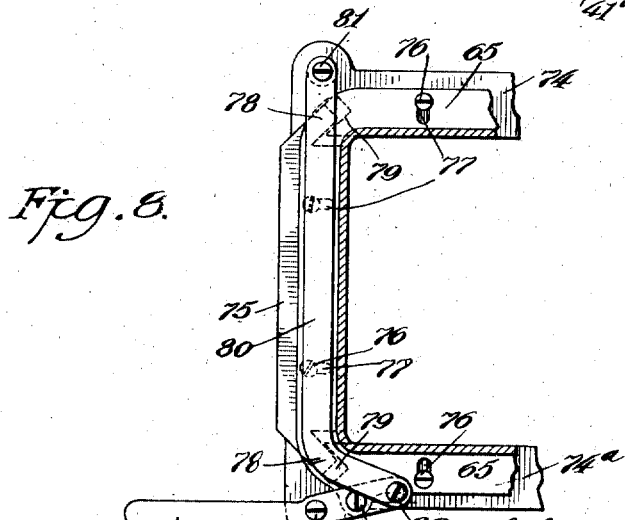

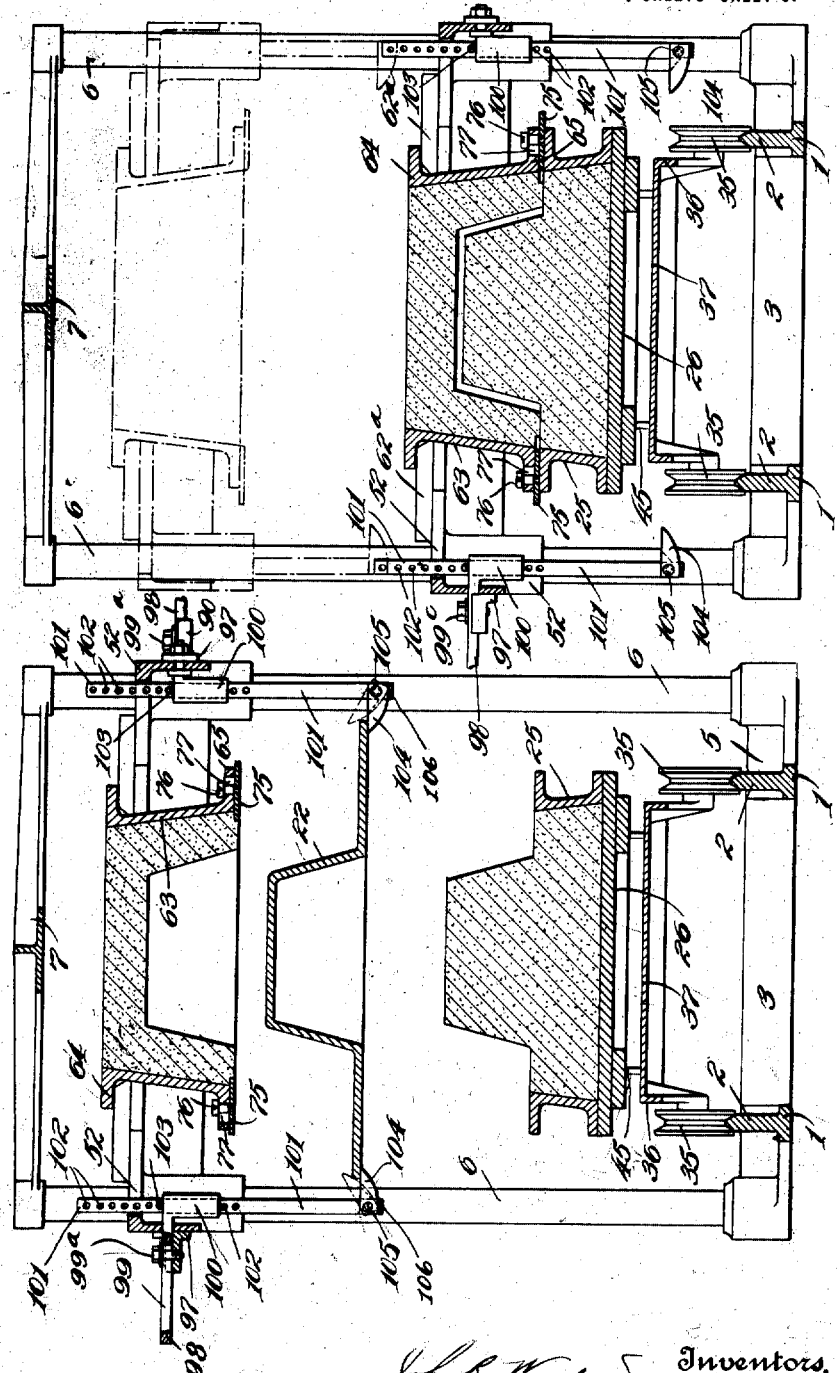

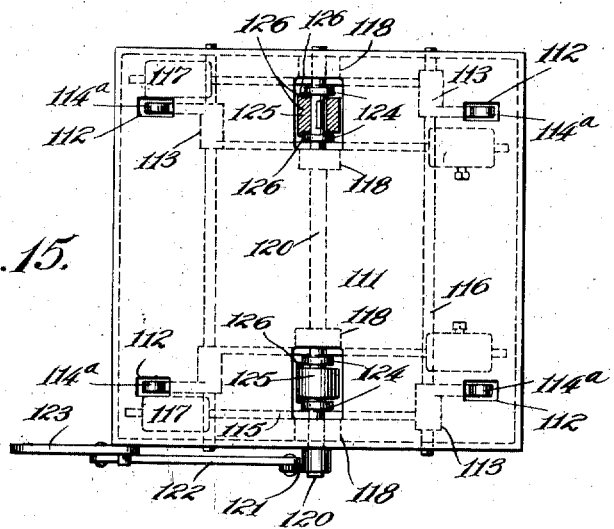
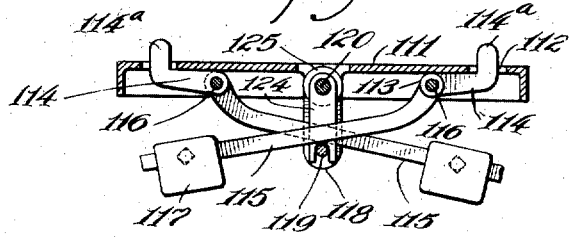
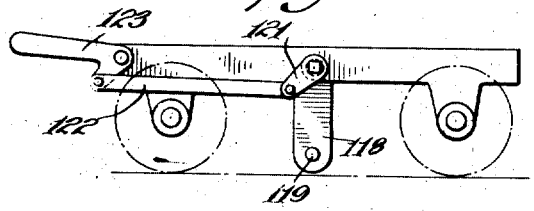

JOHN R. WOOD, OF NEWARK, NEW JERSEY, AND DANIEL CURTIS EPRIGHT, OF SPRING CITY, PENNSYLVANIA, ASSIGNORS TO WILLIAM E. PERRINE, OF CLEVELAND, OHIO.

MOLDING-MACHINE.

1,248,975.

Specification of Letters Patent.

Patented Dec. 4, 1917.

Application filed June 9, 1916. Serial No. 102,619.

*To all whom it may concern:*

Be it known that we, (1) JOHN R. WOOD, (2) DANIEL CURTIS EPRIGHT, citizens of the United States, residing at (1) Newark, (2) Spring City, in the county of (1) Essex, (2) Chester, and State of (1) New Jersey, (2) Pennsylvania, have invented a certain new and useful Improvement in Molding-Machines, of which the following is a full, clear, and exact description, reference being had to the accompanying drawings.

This invention relates to mold making machines and has for its general object to provide a machine wherein both members of the flask (as the cope and the drag) may be conveniently rammed and the mold assembled and removed with a minimum of labor and a maximum of efficiency. A further object of the invention is to provide improved means for supporting and operating the flask sections, both in their initial or charging positions and in their assembled positions. A further object of the invention is to provide improved means for separating the flask sections to permit the drawing of the pattern and for assembling the flask sections after the draw; a further and more limited object of the invention is to provide an improved table which not only performs the functions of a leveling table but forms part of a carriage on which one of the flask members is transferred from the charging to the assembling position, and vice versa; and finally, and more generally the object is to improve the construction and operation of such machines in various particulars as will more fully appear from the description and drawings forming part hereof.

In the drawings, Figure 1 is a side elevation of the machine, showing the positions of the parts during the first molding operation; Fig. 2 is a central longitudinal section showing the positions of the parts at the end of the second molding operation; Fig. 2ᵃ is a vertical cross section taken on the line 2ᵃ—2ᵃ of Fig. 2, one of the cushioning springs being omitted; Fig. 3 is a plan view of the machine, partly in section and the top of the elevating framework being broken off, the parts being in the positions shown in Fig. 1; Fig. 4 is an enlarged vertical cross section taken in the line 4—4 of Fig. 1 showing one of the steps in the operation of molding a core; Fig. 5 is a similar section but showing a further step in the said operation; Fig. 6 is a plan view, partly broken away, of an improved leveling table employed in and forming part of the machine; Fig. 7 is a cross section of the table taken on the line 7—7 of Fig. 6; Fig. 8 is a fragmentary plan view of the mold section supporting means mounted on the cope; Fig. 9 is a detail plan view of an improved corner support for the cope or female mold member; Fig. 10 is a section on the line 10—10 of Fig. 9; Fig. 11 is a sectional detail of the corner support; Fig. 12 is a detail perspective of a bracket employed; Fig. 13 is a sectional elevation showing the positions of the mold members during a later step in the operation of the machine; Fig. 14 is a similar view but showing the positions of said parts during the final step in the operation; Fig. 15 is a plan view of a modified form of leveling table; Fig. 16 is a cross section of the same; and Fig. 17 is a side elevation of said table, parts being omitted.

The molding machine as embodied herein comprises generally a horizontal supporting frame provided with rails on which the carriage is mounted, a framework at one end of the frame for reversibly supporting a flask member, a vertically extending framework carried at the other end of the frame, another flask member mounted in said framework means associated with the framework for raising and lowering the last mentioned flask member and for suspending the pattern plate, and a carriage having a leveling table thereon and movable along the rails between the first and second frameworks.

1 denotes the main frame generally, said frame comprising side rails 2, connected at the ends by cross braces 3, the whole being mounted on swiveled rollers 4. At one end of the horizontal frame is located the vertically extending framework referred to hereinbefore. This framework comprises generally outwardly directed brackets 5 carried by the rails 2, which brackets support vertical tubular posts 6 connected at the top by a spider or frame 7. These posts form the vertical framework within which one of the flask members (as the cope) is reciprocated by means to be described hereinafter.

At the other end of the horizontal frame there is located the framework which reversibly supports the other flask member. The second framework and the operation thereof will now be described. 8 denotes tubular lateral extensions carried by the rails 2 and supporting a rocking cam shaft 9 provided with suitable cams 10 and an operating lever 11. These cams are adapted to engage rollers 12 on sleeves 13 and 13$^a$ which are slidably mounted on rectangular guide posts 14 extending vertically from the extensions 8—see Figs. 4 and 5 of the drawings. The sleeves 13, 13$^a$ are extended above the posts and there provided with bearings for supporting a rotatable drag frame 15, said frame being shown as substantially rectangular in outline and having its opposite sides projected outwardly, as shown at 15$^a$, and these projections being provided with trunnions 16 and 17. The trunnion 16 is mounted in a block 18 which is horizontally pivoted at 19 between a pair of ears 20 at the top of the sleeve 13$^a$. The trunnion 17 rests in a recess 21 at the top of the extension of the sleeve 13 and is itself extended to form a handle whereby the frame may be swung vertically about the pivot 19, as indicated by the dot-and-dash lines in Fig. 5.

The frame just described forms a support for one of the flask members (as the drag) and a coöperating pattern plate during the ramming operation. In Fig. 4 the pattern plate 22 is shown as resting on top of the frame. The pattern plate is provided with opposed guide openings 23 which are adapted to receive guide fingers 24 carried by the drag flask member 25, which is placed upon the pattern plate, as shown in Fig. 4. After the sand ramming operation is finished, a bottom board 26 is placed on the bottom of said drag and secured in position by suitable clamping hooks 27 pivoted to the drag frame at 28 held either in the operative or the inoperative position by thrust springs 29 acting on oppositely inclined cam faces 30 provided on the extensions of the drag frame to which the hooks are pivoted.

In order to lock the drag frame 15 against swinging movement, when in either of the positions shown respectively in Figs. 4 and 5, we provide a bolt 31 having a cross head 32 and inwardly directed pins 33 adapted, when in operation, to underlie said frame at opposite sides of the trunnion 17, as clearly shown in Figs. 3 and 4, the said bolt being carried on a lever 34 pivoted to the upper end of the sleeve 13. The bolt is shown in its inoperative position in Fig. 5, which is its position when the frame is rotated on its trunnions.

After the drag frame 15, pattern plate 22, drag flask 25, and bottom board 26 have been securely clamped together, the frame may be rotated on its trunnions through a half revolution, when the parts will assume the positions shown in Fig. 5.

The rails 2 are beveled at the upper edge to provide tracks to accommodate the grooved rollers 35 of the carriage, the carriage having a leveling table 36 which comprises a platform 37 having two pairs of equalizing levers 38 and 39 pivoted thereto, as at 40, and extending across under the platform in opposite directions and into and through the drop frames 41. The platform 37 is provided with slots 43 upwardly through which pass the curved arms 44 and 45 constituting the flask-supporting ends of the levers 38 and 39, respectively (see Figs. 1, 2, 4, 5, 6 and 7).

The leveling table just described is now moved along the tracks formed by the rails 2 and under the drag frame and the elements clamped thereto, as shown in Figs. 1 and 5 of the drawings; the clamp hooks 27 are then released, permitting the pattern plate, drag flask and bottom board to rest upon the curved arms 44 and 45 of the leveling table and, after the load has adjusted itself against the action of the springs 46 and 47 secured to the said arms and to the platform as shown, the levers 38 and 39 are locked. This locking may be conveniently effected by means of two shafts 48 (see Figs. 4, 5, 6, and 7) each having thereon a pair of keys 48$^a$ on each of which there is slidably mounted a sleeve 49 having a cam 49$^a$ thereon. One of the shafts is provided with an operating lever 50, and the shafts are connected by means of arms 48$^b$ and a link 48$^c$ whereby they may be rotated simultaneously. It will be noted that, when the shafts are rotated in the appropriate direction, one end of each sleeve 49 will engage one side of its drop frame 41 and the cam 49$^a$ on each sleeve will engage a drop arm 51 and press it into engagement with the lever arm 38 or 39, thereby clamping such lever arm between the drop arm and the other side of the drop frame. The lower end of each drop arm is guided in a recess 41$^a$ in the bottom of its drop frame.

The drag frame 15 is now swung upwardly on the pivot 19 out of the way and the leveling table 36 is rolled to the right into the position shown by dotted lines in Fig. 1.

Slidably mounted on the posts 6 is a lifting frame 52 provided with corner bosses 53 to which are pivoted links 54 having hinged connection at their lower ends with the outer ends of oppositely extending arms 55 and 56, the arms 55 being keyed to a solid shaft 57, while the arms 56 are keyed to a sleeve shaft 58 rotatable on the shaft 57, said shaft and sleeve being oppositely rotated by suitable gearing 59, 59$^a$ operated through the instrumentality of a lever 60 operating the shaft 59$^b$ and having connection 60$^a$ with a segment 61, by which the operator may lock the lifting frame at any desired elevation.

The frame 52 carries inwardly directed corner lugs 62 on which are mounted pairs of scissor jaws 62ª adapted to support and hold in any desired adjustment a cope or upper flask 63, shown as having top and bottom flanges 64 and 65. The construction of the jaws 62ª is clearly shown in Figs. 9, 10 and 11. One piece or member 62ᵇ of each pair having a tubular boss 62ᶜ which passes through the opposite piece or member and is keyed to a central bolt 62ᵈ, so that by drawing up tight on the nut 62ᵉ an effective binding action is obtained. These jaws receive therebetween a corner of the cope and support the latter through the engagement of its top flange 64 with the upper ends of the jaws.

To facilitate the raising and lowering of the frame 52 and the parts associated therewith, we provide counterbalancing weights 66 which are conveniently mounted within the posts 6, being connected to the frame by means of cables 67 passing over sheaves 68 at the tops of the posts. The sheaves are removably fitted in the tops of the posts, as shown in Fig. 2, whereby the counterweights may be conveniently removed when occasion may require and others, corresponding to the load to be counterbalanced, may be substituted therefor.

Projecting from the sides of the cope 63 are pairs of ears 69 and between each pair of ears there is pivoted a clamp hook 70, the hooked ends 71 whereof are adapted to engage the bottom edges of the bottom board 26 when the parts are in the positions shown in Fig. 2, thereby to hold the parts against displacement. These hooks are held either in operative or inoperative position by means of the thrust springs 72 engaging oppositely inclined cam faces 73 on cam blocks interposed between the ears 69.

Mounted on the bottom flange of the cope are slides, shown more particularly in Fig. 8 of the drawing. These slides 74, 74ª, and 75 are suspended from the bottom of the flange 65 by means of headed bolts 76 extending through slots 77 in said flange and connected at their lower ends to the slides. The slides 75 are provided with inclined projections 78 adapted to enter correspondingly inclined slots 79 in the slides 74, 74ª. To each end of a slide 74 there is pivotally connected a link 80, as indicated at 81, the opposite end of this link being connected at 82 to one end of a lever pivoted at 83 to the cope flange 65 and at a point on the opposite side of such pivot to a slide 74ª. The lever is provided with an operating handle 85. By moving the lever handles 85, the slides 74 and 74ª may be moved inwardly or outwardly, as desired, and this movement, through the inclined slots 79 and inclined projections 78, will impart a corresponding movement to the slides 75. This manner of supporting and operating the slides constitutes the subject matter of our application No. 802,868 filed November 25, 1913.

It will be noted that some of the posts 6 are provided with a spring 87 surrounding the same and supported at its lower end by an adjustable collar 88. The springs serve as a cushion for the frame 52 as the latter is moved downwardly by the lever 60 and its connected parts.

Coöperating with the frame 52 are the means for drawing the pattern plate from the drag, after the cope has been rammed. The means embodied herein comprises two pairs of opposed hooks which are so arranged that, on the downward movement of the frame, the hooks will pass the pattern plate without operatively engaging the same but, on the upward movement of the frame, the hooks will engage the pattern plate when the cope has been moved a predetermined distance away from the drag and will draw and suspend the pattern plate, which can then be conveniently removed. The side bars of the frame 52 are each slotted, as shown at 89 (see Figs. 1 and 3). Mounted in each of these slots is a pair of brackets 90, each bracket being shown in detail in Fig. 12. Each of these brackets is grooved, as shown at 91, and provided with an elongated rib 92 at one side of the groove and a short rib 93 at the opposite side of the groove which are adapted to enter a slot 89 whereby the brackets may be moved along the slots with the ribs 92 and 93 in engagement therewith. The rib 92 is formed on a lateral extension of the bracket which is perforated, as shown at 94, for a bolt 95 by means of which the bracket may be secured in any adjusted position with reference to the side bar of the frame. An upwardly projecting flange 96 and a downwardly projecting flange 97 coöperate to hold the bracket against tilting.

Slidably mounted in the groove 91 of each bracket is a plate 98 having an elongated slot 99 in the outer portion thereof through which extends the shank of a headed bolt 99ª secured to the bracket, the inner portion of the plate projecting through the slot 89 and carrying a downwardly directed sleeve 100—see Fig. 13. Each of these sleeves has a rectangular bore which is adapted to receive a rectangular bar 101 therewithin. This bar is provided with a vertical series of apertures 102 and a pin 103 which pin is adapted to be inserted through any one of these apertures and to rest on top of its sleeve. Pivoted to the lower end of each bar 101 is a hook 104, this hook being conveniently applied to the bar by having a forked end receiving the bar therewithin and being pivoted to the bar, as shown at 105. Shoulders 106 on the bar are adapted to engage the hook to retain it normally in the position shown in full lines in Figs. 13 and 14 but to allow it to swing upwardly, as indicated in dotted lines in Fig. 13, when striking an object during the downward movement of the frame. The cope, as well as the frame 15, is provided with guide openings for the guide fingers 24 carried by the drag. These guide openings 107 (see Figs. 2ª and 3) are provided in recessed extensions extending from the sides of the cope with slotted plates 108 mounted on top of said projections and adjustable therealong, each of these plates having its inner face so shaped as to conform to the outer surface of the coöperating guide finger whereby the cope and the drag may be accurately centered as the cope is lowered onto the drag. Each plate 108 is shown as secured to the projection of the cope therebelow by means of a bolt 109 extending through the slot in the plate and threaded into the extension therebeneath, said bolt having a head 110 thereon.

In Figs. 15, 16 and 17 there is shown a modification of the leveling table which differs from the one shown in the preceding views principally in the matter of substituting weights for the springs which serve to project the flask-supporting ends of the levers through the table. Another feature is the substitution for a pair of operating shafts of a single centrally arranged shaft which, with its associated parts, serves as a locking means common to both pairs of equalizing levers. Furthermore, each lever has its pivotal axis inside of the load supporting point instead of outside such load supporting point. In the drawing of the modification just referred to, 111 denotes the leveling table, having apertures 112 therethrough for the upper ends of the equalizing levers. Each of these levers comprises a sleeve 113 having arms 114 and 115 projecting therefrom, the arm 114 being provided with an angular extension 114ª adapted to engage and support the drag. The sleeve 113 is journaled upon a rod 116 which is conveniently supported in the skirt of the table. The arm 115 is provided with a weight 117 adjustable therealong. Four of these weighted levers are provided, one for each corner of the table, being mounted in pairs upon the rods 116 at opposite sides of the table. To lock the equalizing levers in any desired position, we use a construction similar to that shown in connection with the previous modification of our invention. Depending from and preferably integral with the bottom of the table is a pair of drop frames 118 connected at their lower ends by a bar 119. Each pair of drop frames receives therewithin the lever arms 115 which are at the corresponding end of the table, the lever arms being closely adjacent to the frames. 120 denotes a shaft which extends across the central portion of the table, being conveniently journaled in the skirt and provided with any convenient operating means. In the embodiment shown herein, this operating means is an arm 121 rigid with one end of the shaft, a link 122 connected to said arm, and a lever 123 pivotally mounted near one end of the table and having one of its arms connected to the link, the other arm having an operating handle. This shaft carries four drop bars 124, the bars being arranged in pairs between pairs of lever arms 115. Secured to the shaft 120 is a pair of sleeves 125, each sleeve having at each end thereof a cam 126. With the parts arranged as described, it will be apparent that, when the drag has been lowered upon the ends 114ª of the lever arms and these arms have assumed their leveling or equalizing position, the said arms may be locked in this position, by rotating the shaft 120, thereby forcing the drop bars 124 into engagement with the arms 115 and clamping the same between the lever arms and the sides of the drop frames 118.

With the parts arranged as described, it will be seen that the general operation is as follows:—The pattern plate and drag will be applied to the frame in the manner shown in Fig. 4. The drag will then be packed and rammed, the bottom board applied to the bottom thereof, being clamped by means of the hooks 27. The frame is then given a half rotation on its trunnions whereby it and the drag and bottom board are inverted, as shown in Fig. 5. The carriage and its leveling table are moved under the drag, the frame being lifted for this purpose, if necessary, by rotating the shaft 9; or, if desired, the frame may be inverted while the carriage is therebeneath, the vertical adjustment of the frame permitting this operation. The drag is lowered on the table by rotating the shaft 9 in the appropriate direction and the table is leveled in the manner described hereinbefore. The frame 15 may then be swung out of the way on its pivot and the carriage with the drag and pattern plate thereupon may be moved to the assembling position shown in Fig. 2 and in dotted lines in Fig. 1. The cope is then lowered onto the drag, being guided and centered by the pins 24 and being clamped by means of the hooks 70. As the cope frame descends the pattern-lifting hooks strike the edges of the pattern plate and swing upwardly on their pivots, clearing the pattern plate. When the flask members are assembled, the cope will be rammed, the hooks 70 released and the frame 52 will be lifted by means of the lever 60 and its connected parts. As the frame moves upwardly the hooks 104 will draw and suspend the pattern plate, as shown in Fig. 13, which plate may then be removed. The frame 52 will again be lowered and the cope will again be positioned on the drag, after which the slides at the bottom of the cope will be retracted—as indicated in Fig. 14. The carriage may then be run back to its original position and the completed mold be removed, in the usual way, after which the operation may be repeated *ad libitum*.

While we have necessarily described in detail the particular embodiment of our invention illustrated herein, we do not propose thereby to be limited to such details except as such limitation may be rendered necessary by the state of the prior art and may be positively included in the claims hereto annexed.

Having thus described our invention, what we claim is:—

1. In a machine for making molds, the combination, with a frame having two stations and a track extending between such stations of a reversible flask, a ramming support at one of said stations, a reciprocable flask support at the other station, a carriage movable along said track, said carriage having a leveling platform thereon, and pattern drawing means at the second station.

2. In a machine for making molds, the combination, with a frame having two stations and a track extending between such stations, of a reversibly supported flask ramming frame at one of said stations, said frame having means for releasably supporting a rammed flask, a vertically reciprocable flask support at the other station, a carriage movable along said track, said carriage having a leveling platform thereon, and means, operative through the movement of the reciprocable flask support away from the carriage, for drawing a pattern from the first mentioned flask frame.

3. In a machine for making molds, the combination, with a frame having two stations and a track extending between such stations, of a reversibly supported flask ramming frame at one of said stations, a vertically reciprocable flask supporting frame at the other station, means carried by the first mentioned frame for releasably supporting a rammed flask, a carriage movable along said track and provided with a leveling platform and means movable with the second frame for automatically lifting a pattern plate from the first flask frame when the second frame has been moved a predetermined distance away from the carriage therebeneath.

4. The combination, with a carriage, of a flask supporting frame, means for depositing on said carriage a flask carried by said frame, a second flask supporting frame, means for reciprocating the same toward and from the first mentioned frame on said carriage and means for automatically drawing the pattern by the movement of the second frame away from the carriage.

5. In a machine of the character described, the combination, with a main frame having two stations and a track extending therebetween, of a reversible supported flask ramming frame at one of said stations, the last mentioned frame being adjustable toward and from the main frame and having means for releasably supporting a flask member, a vertically reciprocable flask support at the other station, a flask member supported thereby, a carriage having a leveling platform and movable along said track between said stations, means for reciprocating said flask support, and means, operative through the movement of said flask support away from the carriage, for drawing a pattern from the first mentioned flask frame.

6. In a machine of the character described, the combination, with a main frame having two stations and a track extending therebetween, of a flask supporting frame at one of said stations, the last mentioned frame being adapted to support a flask member and a pattern plate while said member is being rammed, trunnions on the last mentioned frame, a pair of supports for said trunnions carried by the main frame, said supports being movable toward and from the main frame and one of said trunnions being pivoted to its support, means for reciprocating said supports, a support for another flask member at the other station, means for reciprocating the last mentioned support, a carriage movable along the track and between the flask supporting frame and the last mentioned support, said carriage having means thereon for leveling the rammed flask member, and means at the second station for automatically drawing the pattern by the movement of the reciprocable flask support away from the flask frame on said carriage.

7. In a machine of the character described, the combination, with a main frame having two stations, of a reversibly supported flask ramming frame at one of said stations, the last mentioned frame having means for releasably supporting a flask member, a vertically reciprocable flask support at the other station, a flask member supported thereby, means for reciprocating said flask support, and means, operative through the movement of said flask support away from the first mentioned flask frame for drawing the pattern therefrom.

8. In a machine of the character described, the combination, with a main frame having two stations and a track extending therebetween, of a flask supporting frame at one of said stations, the last mentioned frame being adapted to support a flask member and a pattern plate while said member is being rammed, a pivotal support for the last mentioned frame, a support for another flask member at the other station, means for reciprocating the last mentioned support, a carriage movable along the track and between the flask supporting frame and the last mentioned support, and means at the second station for automatically drawing the pattern by the movement of the reciprocable flask support away from the flask frame on said carriage.

9. The combination, with a main frame having a ramming station, a ramming and assembling station, and a carriage movable between said stations, of a frame for supporting a flask member at the first mentioned station, said frame having trunnions, reciprocable members supporting said trunnions, one of said trunnions being pivoted to its supporting member, a flask member, a pattern plate therefor, means for centering the flask member and pattern plate upon the frame while the flask member is being rammed, means carried by the frame for supporting therefrom the flask member and its bottom board when the frame is inverted after the ramming operation, leveling means on the carriage for such rammed flask member, a flask supporting frame at the ramming and assembling station, means for reciprocating the same toward and from the main frame and toward the carriage having the rammed flask member thereon, and means movable with the reciprocable frame for drawing the pattern from the first mentioned flask member.

10. The combination, with a main frame having a ramming station and a ramming and assembling station and a carriage movable between said stations, of a frame adapted to reversibly support a flask member at the first mentioned station, a flask member, a pattern plate therefor, means for centering the flask member and pattern plate upon the frame while the flask member is being rammed, means carried by the frame for supporting the flask member and its bottom board therefrom when the frame is inverted after the ramming operation, leveling means on the carriage for such rammed flask member, a flask supporting frame at the ramming and assembling station, means for reciprocating the same toward and from the main frame toward the carriage having the rammed flask member thereon, and means associated with the reciprocable frame for drawing the pattern from the first mentioned flask member.

11. In a machine of the character described, the combination of a main frame having thereon a ramming station and a ramming and assembling station, a carriage movable between said stations, means at the first mentioned station for supporting a flask member for ramming and for delivering the same to the carriage, and means at the second station for assembling a second flask member with the first mentioned flask member on the carriage and for supporting the second flask member during the ramming operation.

12. In a machine of the character described, the combination, with a main frame having a ramming and a ramming and assembling station, of means at the first station for supporting a flask member whereby said member may be rammed, a carriage movable between said stations, means at the first station whereby the rammed flask member may be delivered to the carriage, means at the second station for reciprocably supporting a second flask member and for assembling said flask members and means for automatically drawing the pattern plate as the second flask member is moved away from the first flask member after the ramming of the second flask member.

13. In a machine of the character described, the combination, with a supporting and leveling device, of a flask-supporting frame rotatably mounted on one axis for inversion over said device, said frame being also hinged on another axis for swinging movement above said device, and means for moving the frame toward and from said device.

14. In a machine of the character described, the combination of a frame, a ramming station and a ramming and assembling station on said frame, a carriage movable on said frame between said stations, means at the first mentioned station for raising and lowering a flask section from and toward said carriage, and means at the second station for raising and lowering another flask section with respect to the section on the carriage.

15. In a machine of the character described, the combination of a frame having a ramming station and a ramming and assembling station, a carriage movable between said stations, means for rotatably supporting a flask section at the ramming station, said means being adjustable to raise and lower said section with respect to the carriage, and means on the frame, at the second station, for joining another flask section to the first mentioned section while such first mentioned section is supported on the carriage at the second station.

16. In a machine of the character described, the combination of a frame having a ramming station and an assembling station, a carriage movable between said stations, a vertically movable drag-supporting frame at the first mentioned station, said frame being pivotally mounted for inversion of the drag above the carriage, and a vertically movable cope-supporting frame at the second station adapted to raise and lower a cope from and toward the drag on the carriage.

17. In a machine of the character described, the combination of a frame having a pair of uprights, a bearing reciprocably guided on each upright, a flask supporting frame rotatably mounted in said bearings, the said frame being pivotally connected to one of said bearings whereby it may be swung bodily about such pivot.

18. In a machine of the character described, the combination of a main frame, a support carried thereby, a flask supporting frame pivotally connected at one end to said support, and means carried by the main frame for supporting the opposite end of said flask-supporting frame.

19. In a machine of the character described, the combination, with a flask member having a flange, of a reciprocable frame for said flask member, said frame having adjustable means adapted to engage beneath the flange thereby to support flask members of varying dimensions and shapes.

20. In a machine of the character described, the combination, with a vertically reciprocable frame, of a plurality of pairs of jaws supported by said frame, the jaws of each pair being movable toward and from each other, and a flask member having a flange adapted to rest upon said jaws.

21. In a machine of the character described, the combination of a vertically reciprocable polygonal frame having at each corner thereof a pair of pivotally supported jaws, the jaws of each pair being movable toward and from each other, and a polygonal flask member having a flange adapted to rest upon and be supported by said jaws.

22. In a machine of the character described, the combination, with means for supporting a flask member, of a frame reciprocable toward and from the said flask member, a flask member supported by said frame, means carried by the flask members and cooperating to center the same when the said members are brought into operative relation by the movement of the frame, and means for cushioning the impact of said flask members.

23. In a machine of the character described, the combination, with a flask support, of a flask member supported thereby, posts extending above the flask member and its support, a frame reciprocably mounted on said posts, a flask member carried by said frame, means for securing the flask members in assembled position, and springs on said posts beneath said frame.

24. In a machine of the character described, the combination, with a flask member and means for supporting the same, of a frame reciprocable toward and from the said flask member, a flask member supported by said frame, and means for cushioning the impact of said flask members.

25. In a machine of the character described, the combination, with a flask support, of a flask member supported thereby, a frame reciprocable toward and from said support, a flask member carried by said frame, means for securing the flask members in assembled position, and means for cushioning the impact of said flask members.

26. In a machine of the character described, the combination, with a plurality of hollow posts, of a frame reciprocably mounted on said posts, a flask member carried by said frame, means for reciprocating said flask member on said posts, counterweights in said posts, and cables connecting the counterweights with said frame.

27. In a machine of the character described, the combination, with a plurality of hollow posts, of a frame reciprocably mounted on said posts, a flask member carried by said frame, means for reciprocating said flask member on said posts, counterweights in said posts, cables connecting the counterweights with said frame, and cushion springs surrounding said posts below said frame.

28. In a machine of the character described, the combination of a support, a flask member carried thereby, a frame reciprocable toward and from the flask support and the flask member thereon, a flask member carried by said frame, a pattern plate carried by the first mentioned flask member and having portions projecting therebeyond, and adjustable means carried by the frame and adapted to engage the projecting portions of the pattern plate when the frame shall have moved a predetermined distance away from the support for the first mentioned flask member, the last mentioned means comprising movable members adapted to pass below the pattern plate as the frame descends without engaging the same but to engage the pattern plate as the frame moves away from the first mentioned flask member and its support.

29. The combination, with a reciprocable flask supporting frame, of pattern drawing means connected with said frame and vertically adjustable thereon, to accommodate flasks of different sizes.

30. The combination, with a reciprocable flask supporting frame, of pattern drawing means adjustably connected with said frame, said means comprising a plurality of brackets adjustably mounted in the frame, and bars adjustably supported from said brackets, each bar having a hook member pivotally connected thereto with means engaging the hook member to limit its movement in one direction whereby the said members may move upwardly about their pivots upon encountering an object as the frame descends but will engage and elevate such object as the frame ascends.

31. In a machine of the character described, the combination of a vertically movable frame, jaws carried thereby and adapted to engage a flash section, and lifters depending from the frame and having pivoted fingers at their lower ends constructed to engage and lift a pattern plate when the frame is raised and to pass said pattern plate when the frame is lowered.

32. In a machine of the character described, the combination of a vertically movable frame, jaws carried thereby and adapted to engage a flask section, lifters depending from the frame and having pivoted fingers at their lower ends constructed to engage and lift a pattern plate when the frame is raised and to pass said pattern plate when the frame is lowered, said lifters being laterally and vertically adjustable to engage pattern plates of different sizes.

33. In a machine for making molds, the combination of a main frame having guides, a flask-supporting frame slidable on said guides, a rock shaft having an arm connected to one side of the sliding frame, a sleeve on the rock shaft having an arm connected to the other side of the sliding frame, and means to simultaneously rock said shaft and sleeve in opposite directions, said means comprising a lever, a shaft, and gearing between said shaft and the rock shaft and sleeve.

34. The combination, with a reciprocable flask supporting frame, of pattern drawing means adjustably connected with said frame, said means comprising a plurality of brackets adjustably mounted in the frame, sleeve-carrying plates adjustably mounted in said brackets, and a rod adjustably mounted in each sleeve and having a hook pivoted thereto in such manner that, as the frame descends, the hooks will swing upwardly and clear the pattern plate but will be retained in engaging position to elevate the pattern plate as the frame moves upwardly.

35. In a machine for making molds, the combination of a frame having a track thereon, a carriage movable on the track, vertically adjustable supports at opposite sides of the track at one end of the frame adapted to support a flask section and lower the same onto the carriage, guides at the other end of the frame and at opposite sides of the track, and means slidable on said guides to support and raise and lower another flask section, whereby said flask sections may be assembled when the carriage with the first mentioned flask section thereon is moved to position between said guides.

In testimony whereof, we hereunto affix our signatures in the presence of two witnesses.

JOHN R. WOOD.
DANIEL CURTIS EPRIGHT.

Witnesses:
DANIEL J. BRENNAN,
W. A. PERRINE.